(12) United States Patent
Smith et al.

(10) Patent No.: US 7,631,738 B2
(45) Date of Patent: *Dec. 15, 2009

(54) FLUIDLY ACTUATED SPRAG

(75) Inventors: David P. Smith, Reddick, IL (US); Eric R. Lauterbach, Joliet, IL (US); Daniel T. Mather, Lockport, IL (US); Jonathan L. Buelow, Woodridge, IL (US)

(73) Assignee: Caterpillar Inc., Peoria, IL (US)

( * ) Notice: Subject to any disclaimer, the term of this patent is extended or adjusted under 35 U.S.C. 154(b) by 441 days.

This patent is subject to a terminal disclaimer.

(21) Appl. No.: 11/589,962

(22) Filed: Oct. 31, 2006

(65) Prior Publication Data

US 2008/0099304 A1 May 1, 2008

(51) Int. Cl.
*F16D 15/00* (2006.01)
*F16D 41/06* (2006.01)
(52) U.S. Cl. .................................. 192/45.1; 192/41 A
(58) Field of Classification Search ............... 192/45.1, 192/41 A, 85 AT
See application file for complete search history.

(56) References Cited

U.S. PATENT DOCUMENTS

| | | | |
|---|---|---|---|
| 2,172,653 A * | 9/1939 | Flogaus ...................... 192/45 |
| 3,054,488 A * | 9/1962 | General et al. ................ 192/44 |
| 4,050,560 A * | 9/1977 | Torstenfelt .............. 192/85 AT |
| 5,482,144 A | 1/1996 | Vranish |
| 5,518,094 A | 5/1996 | Myrick |
| 5,638,929 A * | 6/1997 | Park ............................ 192/44 |
| 5,967,267 A | 10/1999 | Vranish |
| 6,502,393 B1 | 1/2003 | Stephenson et al. |
| 6,536,571 B1 | 3/2003 | Myrick |
| 6,584,769 B1 | 7/2003 | Bruun |
| 6,640,949 B1 | 11/2003 | Vranish |
| 6,651,545 B2 | 11/2003 | Nippert |
| 6,748,738 B2 | 6/2004 | Smith |
| 6,848,254 B2 | 2/2005 | Du |
| 6,935,114 B2 | 8/2005 | Hajek et al. |
| 6,974,011 B2 * | 12/2005 | Gradu et al. .................. 192/38 |
| 7,497,156 B2 * | 3/2009 | Smith et al. .................... 92/68 |
| 2008/0156596 A1 * | 7/2008 | Smith et al. ................ 188/82.8 |

\* cited by examiner

*Primary Examiner*—Dirk Wright
(74) *Attorney, Agent, or Firm*—Finnegan, Henderson, Farabow, Garrett & Dunner

(57) ABSTRACT

A sprag is disclosed. The sprag is configured to operate in a first mode allowing substantially mutual rotation of inner and outer races about an axis and a second mode allowing relative rotation between the inner and outer races. The sprag includes at least one actuator configured to selectively extend and retract and an outer surface configured to selectively lock the inner and outer races together as a function of the at least one actuator selectively extending.

20 Claims, 4 Drawing Sheets

FLUIDLY ACTUATED SPRAG

CROSS REFERENCED APPLICATIONS

This application is related to co-pending application titled "Fluid Motor" filed Oct. 31, 2006 and having a patent application Ser. No. of 11/589,778.

TECHNICAL FIELD

The present disclosure relates to a motor and, more particularly, to a fluid motor.

BACKGROUND

Sprags and similar devices are often used to transfer rotary movement from a drive member, e.g., an inner race, and a reaction member, e.g., an outer race in a first direction, e.g., clockwise, and to not transfer rotary movement therebetween in a second direction opposite the first direction, e.g., counter-clockwise. Typically a sprag includes a partially arcuate outer surface that is biased into frictional engagement with an inclined surface associated with either or both of an outer surface of the inner race and/or an inner surface of the outer race. Upon movement of the drive member in the biasing direction, the sprag becomes wedged between and substantially locks the drive and reaction members together. Upon movement of the drive member in the non-biasing direction, the sprag overcomes the biasing force, moves away from the inclined surface, and establishes sliding contact between the drive and reaction members. Thus, when the sprag substantially locks the drive and reaction members together, torque applied to the drive member is transferred to the reaction member, and when the sprag establishes sliding contact between the drive and reaction members, torque applied to the drive member is not transferred to the reaction member.

U.S. Pat. No. 5,482,144 ("the '144 patent") issued to Vranish discloses a three dimensional roller locking sprag. The sprag of the '144 patent includes two pairs of curved peripheral side surfaces which respectively contact a pair of mutual diverging side wall surfaces of a groove disposed within a drive member and a reaction member. The sprag of the '144 patent substantially locks the drive and reaction members together for torque transfer therebetween in a first direction and establishes a sliding contact therebetween in a second direction.

Although the sprag of the '144 patent may transfer torque from the drive member to the reaction member in a first direction, movement of the drive member is required to lock and thus transfer torque to the reaction member. Additionally, the sprag of the '144 patent passively transfers torque from the drive member to the reaction member. Furthermore, the frictional engagement of the sprag of the '144 patent in a substantially locked position may be insufficiently small to transfer relatively large torques between the drive and reaction members.

The present disclosure is directed to overcoming one or more of the shortcomings set forth above.

SUMMARY OF THE INVENTION

In one aspect, the present disclosure is directed to a sprag configured to operate in a first mode allowing substantially mutual rotation of inner and outer races about an axis and a second mode allowing relative rotation between the inner and outer races. The sprag includes at least one actuator configured to selectively extend and retract and an outer surface configured to selectively lock the inner and outer races together as a function of the at least one actuator selectively extending.

In another aspect, the present disclosure is directed to method of transferring torque between an inner race and an outer race. The method includes transmitting a first force to at least one sprag. The at least one sprag is disposed between the inner and outer races. The method also includes actuating the at least one sprag to substantially lock the inner and outer races together and transferring the first force to the inner and outer races via the at least one sprag.

In yet another aspect, the present disclosure is directed to a sprag. The sprag includes an outer surface configured to selectively engage inner and outer races. The sprag also includes an inner surface supported on a pin, first and second parts each forming at least a portion of the outer surface, and at least one fluid actuator and at least one biasing member. The at least one fluid actuator affects movement of the first and second parts with respect to one another to selectively allow the outer surface to engage the inner and outer races as a function of pressurized fluid selectively supplied to the at least one fluid actuator

DETAILED DESCRIPTION

Figure 1:
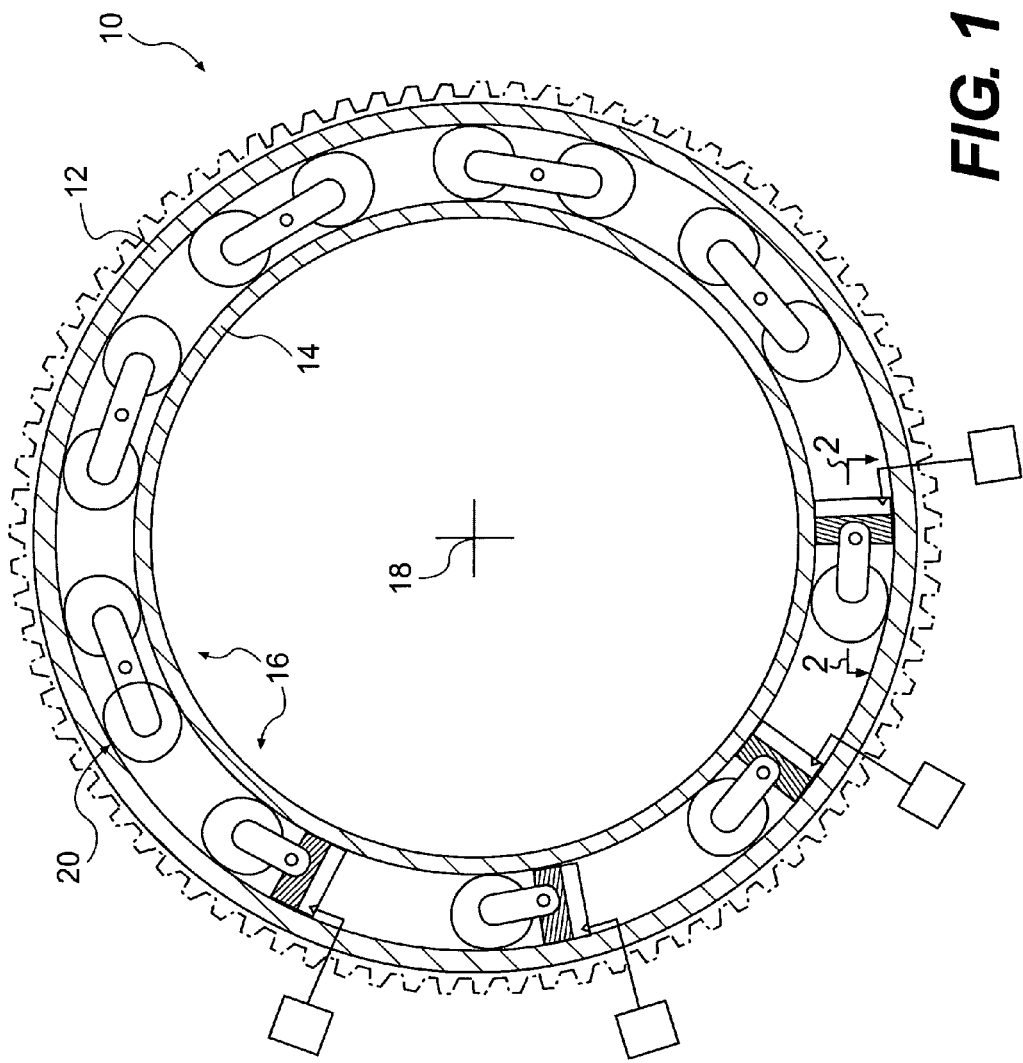
FIG. 1 is a diagrammatic side-view illustration of an exemplary fluid motor in accordance with the present disclosure.

FIG. 1 illustrates an exemplary fluid motor 10. Fluid motor 10 may include an outer race 12, an inner race 14, and a plurality of sprag assemblies 16. Fluid motor 10 may include a longitudinal axis 18 defining a rotational axis substantially about which outer race 12 and inner race 14 may be configured to rotate. Outer race 12 also may be disposed radially outward of inner race 14 and sprag assemblies 16 may be arranged between outer and inner races 12, 14. Outer race 12 may include an outer surface thereof having a toothed profile configured to mesh with one or more conventional gears. It is contemplated that inner race 14 may include an inner surface thereof having a toothed profile configured to mesh with one or more conventional gears and/or both an outer surface of outer race 12 and an inner surface of inner race 14 may have toothed profiles. It is further contemplated that outer and inner races 12, 14 may be configured to be connected directly to a shaft, e.g., welded to the shaft, connected to a sprocket, e.g., configured as a friction or toothed pulley, and/or configured to be connected to any other device to which rotary motion is desired to be delivered and connected via any manner known in the art.

As will be explained below in detail, each of sprag assemblies 16 may be selectively fixed to outer and inner races 12, 14 to cause substantially mutual rotation of outer and inner races 12, 14 about axis 18. This mutual rotation of outer and inner races 12, 14 may be a function of pressurized fluid selectively supplied to one or more of sprag assemblies 16. It is contemplated that adjusting the amount, pressure, and timing of the pressurized fluid selectively supplied to sprag assemblies 16, may establish a variable rotational output from fluid motor 10.

Figure 2:
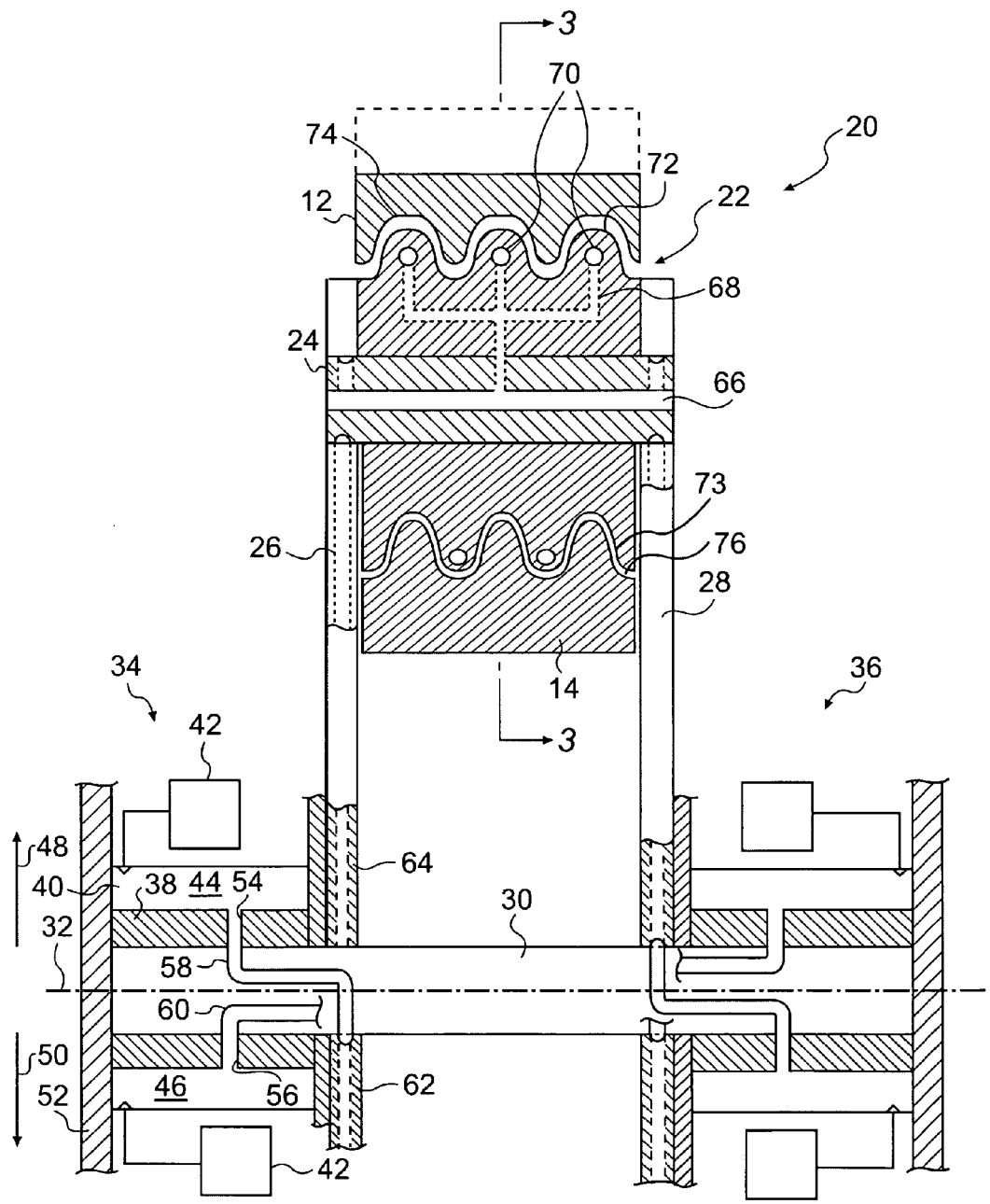
FIG. 2 is a diagrammatic sectional illustration of a sprag assembly along view 2-2 of the fluid motor of FIG. 1.

FIG. 2 illustrates a partial view of a first sprag assembly 20 taken along view 2-2 of FIG. 1. First sprag assembly 20 may include a first sprag 22 rotationally supported on a first sprag pin 24 that may be fixedly connected at opposite ends thereof to first ends of first and second links 26, 28. First and second links 26, 28 may be connected at a substantially center location thereof to an actuator pin 30. A longitudinal axis 32 of actuator pin 30 may define a sprag assembly center line about which first sprag assembly 22 may be substantially symmetrical. That is, first and second links 26, 28 may be connected at second ends thereof to a second sprag pin supporting a second sprag (not illustrated). It is contemplated that first and second links 26, 28 may include any shape, e.g., elongate, and may be fixed to first sprag pin 24 and the second sprag pin (not illustrated) via any suitable method, e.g., cotter pin, stamped, welded, or brazed.

First sprag assembly 22 may also include first and second actuator assemblies 34, 36 configured to actuate and displace first sprag 22. First actuator assembly 24 may include a piston 38 operatively connected to actuator pin 30 and configured to reciprocate within a cylinder 40 operatively connected to a housing 52. Piston 38 may reciprocate within cylinder 40 as a function of pressurized fluid selectively supplied to cylinder 40 on opposite sides of piston 38. Specifically, piston 38 may be disposed within cylinder 40 and may define first and second fluid chambers 44, 46. Pressurized fluid may be selectively supplied to first and second fluid chambers 44, 46 in any suitable manner, such as, via a hydraulic circuit 42. For example, hydraulic circuit 42 may include a source of pressurized fluid (not illustrated), a fluid reservoir (not illustrated), and at least one valve (not illustrated) configured to selectively fluidly connect first and second chambers 44, 46 with either the source of pressurized fluid or the fluid reservoir. It is contemplated that the source of pressurized fluid and/or the fluid reservoir may include an accumulator.

As is known in the art, piston 38 may be urged toward a first direction 48 with respect to housing 52 if second fluid chamber 46 is fluidly connected to the source of pressurized fluid and first fluid chamber 44 is fluidly connected with the reservoir. Conversely, piston 38 may be urged toward a second direction 50 with respect to housing 52 if first fluid chamber 44 is fluidly connected with the source of pressurized fluid and second chamber 46 is fluidly connected with the reservoir. It is contemplated that second fluid actuator 36 may be substantially similar to first fluid actuator 34 in structure and operation and thus is not further described. It is also contemplated that first and second fluid actuators 34, 36 may include any type of piston-cylinder arrangement known in the art and housing 52 may or may not form a structural part thereof. It is further contemplated that the stroke of piston 38, e.g., the reciprocal motion of piston 38 with respect to cylinder 40, may be any length.

Piston 38 may also include first and second fluid passageways 54, 56 disposed therein and configured to fluidly communicate pressurized fluid selectively supplied to first and second fluid chambers 44, 46 toward third and fourth fluid passageways 58, 60, respectively. Third and fourth fluid passageways 58, 60 may be disposed within actuator pin 30 and configured to fluidly communicate pressurized fluid from first and second fluid passageways 54, 56 toward first and second link passageways 62, 64, respectively. Second link passageway 64 may be disposed within first link 26 and configured to fluidly communicate pressurized fluid from second and fourth fluid passageways 56, 60, and thus second fluid chamber 46, toward sprag pin passageway 66. First link passageway 62 may also be disposed within first link 26 and configured to fluidly communicate pressurized fluid toward a sprag pin passageway disposed in the second sprag pin (not illustrated). As such, second fluid passageway 56, fourth fluid passageway 60, second link passageway 62 and sprag pin passageway 66 may establish a first fluid path configured to communicate pressurized fluid selectively supplied to second fluid chamber 46 toward first sprag 22. It is contemplated that first fluid passageway 54, third fluid passageway 58, first link passageway 62, and the sprag pin passageway disposed within the second sprag pin (not illustrated) may define a second fluid path configured to communicate pressurized fluid selectively supplied to first fluid chamber 44 toward the second sprag. It is also contemplated that the fluid connections between any of the fluid communicating passageways may include any type of fluid connection known in the art, such as, for example, a partial or full circumferential groove disposed adjacent an end of an upstream or downstream passageway.

First sprag 22 may be rotationally supported on sprag pin 24 and may include a sprag passageway 68 disposed therein and in fluid communication with sprag pin passageway 66. Sprag passageway 68 may be configured to communicate pressurized fluid from sprag pin passageway 66 toward one or more sprag actuators 70. First sprag 22 may also include one or more ridges 72, 73 on an outer surface thereof. Ridges 72, 73 may be complimentary in shape and configured to selectively engage grooves 74, 76 disposed on the inner surface of outer race 12 and the outer surface of inner race 14, respectively. It is contemplated that ridges 72, 73 and grooves 74, 76 may include any quantity and/or any shape, e.g., arcuate, triangular, square or rectangular stepped, and may be regularly or irregularly spaced with respect to an axial axis of first sprag 22. It is also contemplated that ridges 73 may be staggered with respect to ridges 72 according to any amount of offset therebetween. It is further contemplated that the description above and below with respect to first sprag 22 is equally applicable to each sprag of the plurality of sprag assemblies 16.

Figure 3:
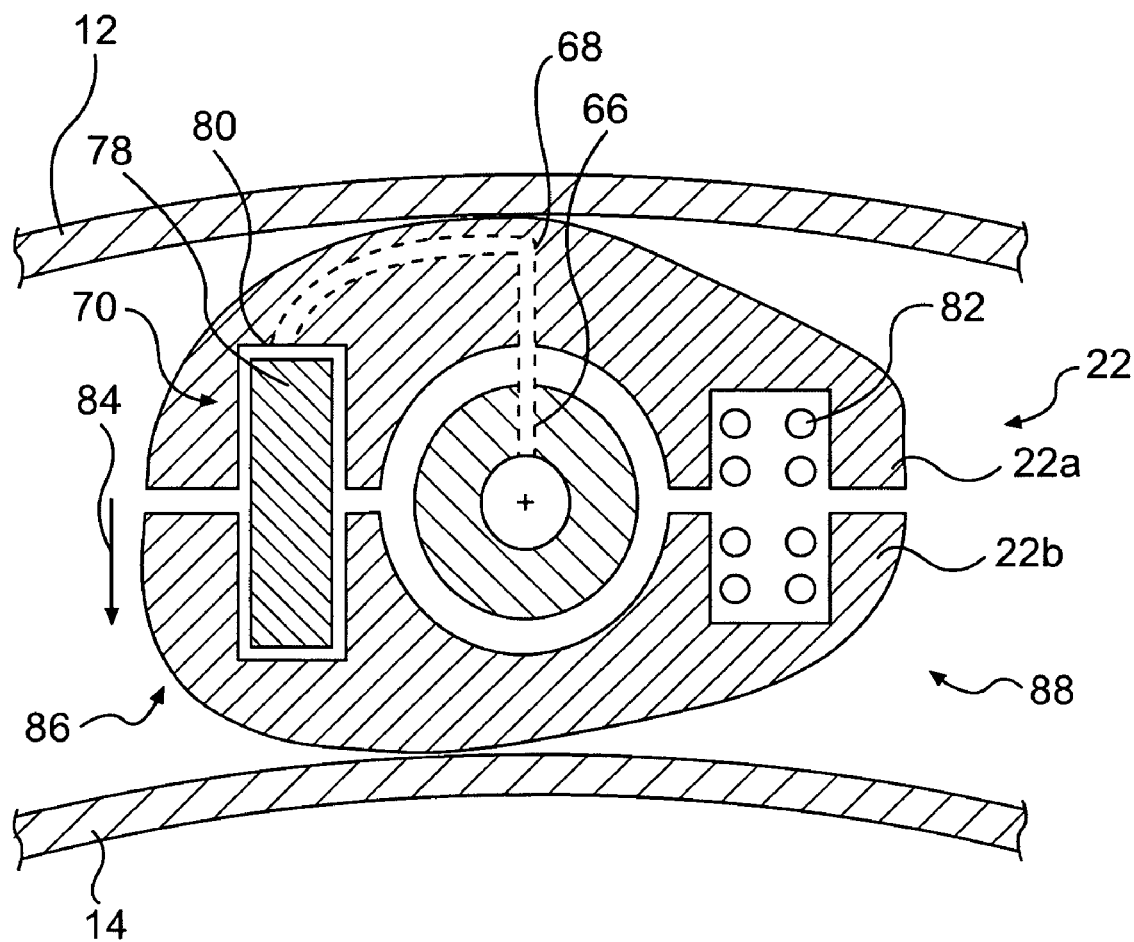
FIG. 3 is a diagrammatic side-view illustration of a sprag along view 3-3 of the sprag assembly of FIG. 2.

FIG. 3 illustrates an side-view of first sprag 22 taken along line 3-3 of FIG. 2. Each of sprag actuators 70 may include a piston 78 configured to reciprocate within a cylinder 80 as a function of pressurized fluid selectively supplied to cylinder 80 from sprag passageway 68. First sprag 22 may additionally include a first part 22a and a second part 22b and movement of piston 78 within cylinder 80 in a first direction 84 may urge first part 22a away from second part 22b and thus cause first sprag 22 to frictionally engage and substantially lock outer and inner races 12, 14 together. First sprag 22 may further include a plurality of springs 82 (only one of which is illustrated) configured to oppose the movement of piston 78 within cylinder 80 in the first direction 84 and urge first part 22a away from second part 22b. First sprag 22 may be oblong in shape including a first or long dimension end 86 in which actuators 70 may be disposed and a second or short dimension end 88 in which springs 82 may be disposed. As such, movement of piston 78 in first direction 84 may overcome the bias of springs 80 and may urge first and second parts 22a, 22b away from one another expanding the long dimension end 86 and thus fixedly engaging sprag 22 with outer and inner races 12, 14. Conversely, springs 80 may urge first and second parts 22a, 22b away from one another expanding the short dimension end 88 when pressurized fluid is selectively not supplied to cylinder 78, which may not fixedly engage sprag 22 with outer and inner races 12, 14. It is contemplated that the size of long dimension end 86 and short dimension end 88 may be any desired length to achieve any desired amount of fixed engagement and/or non-engagement of sprag 22 with respect to outer and inner races 12, 14. It is also contemplated that actuators 70 may, alternatively, include any type of actuator and springs 80 may include any type of biasing element configured to urge first and second parts 22a 22b toward outer and inner races 12, 14. It is further contemplated that first sprag 22 may include any quantity of actuators 70 and springs 82, e.g., three, and may or may not include the same quantity of actuators 70 and springs 82.

Figure 4:
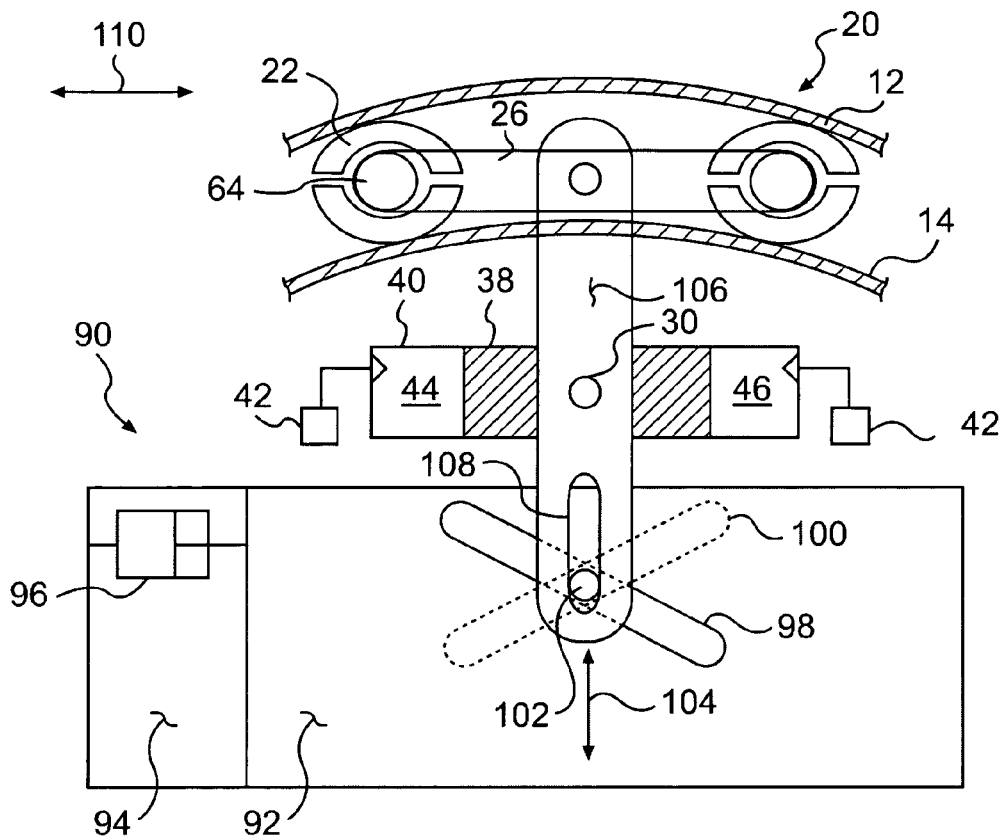
FIG. 4 is a diagrammatic side-view illustration of an exemplary adjustment mechanism for the sprag assembly of the fluid motor of FIG. 1.

FIG. 4 illustrates an exemplary adjustment mechanism 90 configured to vary the amount of movement of piston 38 transferred to first and second links 26, 28. Specifically, adjustment mechanism 90 may include first and second adjusting plates 92, 94 configured to be movable with respect to one another via an adjusting actuator 96. Adjusting actuator 96 may include a piston-cylinder arrangement connected at one end thereof to first adjusting plate 92 and another end thereof connected to second adjusting plate 94. As such, actuation, e.g., extension and retraction of adjusting actuator 96, may cause first and second adjusting plates 92, 94 to move relative to one another. Movement between plates 92 and 94 may cause a first slot 98 disposed within first adjusting plate 92 to move relative to a second slot 100 disposed within second adjusting plate 94. First slot 98 may be disposed substantially at an angle with respect to second slot 100 and arranged so as to at least partially overlap second slot 100. For example, first and second slots 98, 100 may form a substantially "X" shape. It is contemplated that first and second slots 98, 100 may be any shape, e.g., substantially linear or arcuate.

Adjustment mechanism 90 may also include a pivot pin 102 disposed within first and second slots 98, 100 and configured to reciprocate along a pivot direction 104. Specifically, pivot pin 102 may be configured to move as a function of first adjusting plate 92 moving relative to second adjusting plate 94. For example, as adjusting actuator 96 extends, first and second adjusting plates 92, 94 may move in a first direction resulting in pivot pin 102 moving along pivot direction 104 toward sprag assembly 20 as first and second slots 98, 100 overlap at progressively different locations. Similarly, as adjusting actuator 96 retracts, first and second adjusting plates 92, 94 may move in a second direction resulting in pivot pin 102 moving along pivot direction 104 away from sprag assembly 20 as first and second slots 98, 100 overlap at progressively different locations.

Adjustment mechanism 90 may also include a pivot link 106 pivotally connected at a first end thereof to pivot pin 102 via a slot 108, pivotally connected at a second end thereof to link 26, and pivotally connected at a location between the first and second ends to actuator pin 30. As such, movement of piston 38 as a function of pressurized fluid selectively supplied to first or second fluid chambers 44, 46 may result in pivot link 106 pivoting about pivot pin 102 and thus causing link 26 to reciprocate along a direction 110 substantially perpendicular to pivot direction 104. For example, pivot link 106 may act as an adjustable lever arm configured to transfer reciprocal movement of piston 38 to reciprocal movement of link 26 as a function of the position of pivot pin 102, which in turn may be adjusted by adjustment actuator 96 moving first and second adjustment plates 92, 94 relative to one another. It is contemplated that the ratio of lengths of slot 108 and pivot pin 106 may provide a range of lever arm ratios to provide a range of ratios between piston 38 movement and link 26 movement. It is also contemplated that the length of pivot link 106 and slot 108 may be any desired length and may be configured to provide any lever arm ratio. For example, the ratio of the length of slot 108 to the length of pivot link 106 may be approximately 1:2 to provide an adjustable lever arm ratio from a maximum amount of the movement of piston 38 transferred to link 26 to approximately half of the movement of piston 38 transferred to link 26. It is contemplated that link 26 may, alternatively, include a plurality of links and may or may not be configured to pivot about actuator pin 30.

Figure 5:
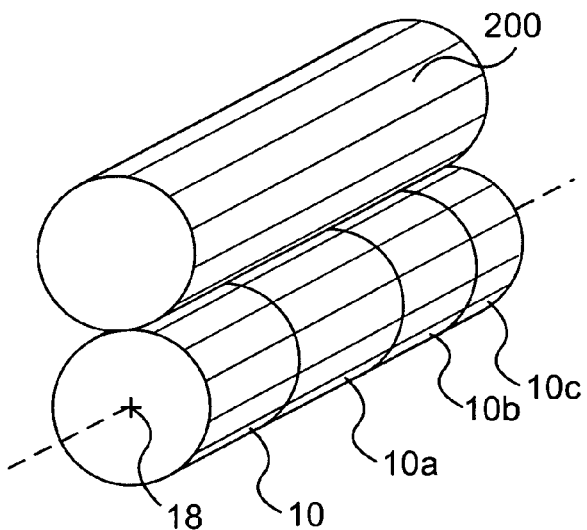
FIG. 5 is a diagrammatic illustration of the fluid motor of FIG. 1 operatively connected to an output.

FIG. 5 illustrates fluid motor 10 operatively connected to an output 200. Specifically, fluid motor 10 may be operatively connected to output 200 via gear teeth disposed on the outer surface of outer race 12. The structure and operation of gear teeth is well known in the art and, as such, is not further explained. Additionally, a plurality of fluid motors 10, 10a, 10b, 10c may each be operatively connected to output 200. Fluid motors 10a, 10b, 10c may be substantially similar to fluid motor 10 and may be similarly configured to provide rotary motion. As such, fluid motors 10, 10a, 10b, 10c may together establish a combined fluid motor configured to impart rotary motion to output 200. It is contemplated that any quantity of fluid motors 10, 10a, 10b, 10c may be operatively connected to output 200 and may or may not be connected in series with each other.

INDUSTRIAL APPLICABILITY

The disclosed fluid motor 10 may be applicable to system where rotary motion is desired. Fluid motor 10 may convert hydraulic potential energy into mechanical kinetic energy and may be configured to provide a localized rotary motion to one or more components. The operation of fluid motor 10 is explained below.

Referring to FIGS. 1 and 4, fluid motor 10 may be operatively connected to output 200 and configured to rotate output 200. For example, output 200 may be a gear, sprocket, or other suitable output device connected to fluid motor 10 via any suitable connection, e.g., directly meshing gear teeth or a belt. Alternatively, output 200 may be directly connected to one or more components of fluid motor 10, e.g., a shaft directly connected to inner race 14. As such, fluid motor 10 may be configured to rotate output 200 in either a clockwise or a counter-clockwise direction and in either drive or retarding load conditions.

Referring to FIG. 2, pressurized fluid may be selectively communicated from hydraulic circuit 42 toward first and second fluid chambers 44, 46 to displace piston 38 in either direction 50 or direction 48. Specifically, pressurized fluid may be delivered to second fluid chamber 46 to move piston 38 in direction 48. Additionally, pressurized fluid communicated to second fluid chamber 46 may be communicated along the first fluid path, e.g., passageways 56, 60, 64, communicated to sprag pin passageway 66, sprag passageway 68, and to actuators 70. Each of pistons 78, e.g., the piston for each of actuators 70, may move in direction 84 and expand the large dimension end of first sprag 22 and thus lock outer and inner races 12, 14 together. With first sprag 22 locking outer and inner races 12, 14 and first sprag 22 connected to actuator pin 30 and thus piston 38 via a linkage system, e.g., link 26, movement of piston 38 resulting from pressurized fluid communicated to second fluid chamber 46 may urge sprag 22 in a substantially linear direction with respect to axis 18 (see FIG. 1) and thus cause outer and inner races 12, 14 to rotate about axis 18. That is, movement of piston 38 may be transferred to first sprag 22 and thus to outer and inner races 12, 14 tangentially to axis 18. It is contemplated that pistons 78 may actuate first sprag 22 to engage and lock outer and inner races 12, 14 substantially at the same time as the pressurized fluid communicated to second fluid chamber 46 moves piston 38 in direction 48. It is also contemplated that movement of piston 38 in direction 48 may correspond to a counter-clockwise direction of outer and inner races 12, 14 and thus of fluid motor 10 (see FIG. 1.).

Movement of fluid motor 10 in a clockwise direction may be established by selectively communicating pressurized fluid to first fluid chamber 44, the second fluid path, e.g., passageways 54, 58, 62, the sprag pin passageway of the second sprag, and communicated to the sprag passageway of the second sprag and the respective actuators therein. It is contemplated that the operation of the second sprag is substantially similar to that of first sprag 22 and as such is not further explained. It is also contemplated that pressurized fluid may be selectively and substantially simultaneously supplied to respective first fluid chambers, e.g., fluid chambers 44 or 46, of both first and second fluid actuators 34, 36, along first and second fluid paths, and combined within respective sprag pin passageways, e.g., sprag pin passageway 66, for selective communication to respective sprags, e.g., first sprag 22.

Referring again to FIG. 1, pressurized fluid may be selectively supplied to additional sprag assemblies 16. For example, pressurized fluid may be supplied to the next adjacent counter-clockwise sprag assembly with respect to first sprag assembly 22 to further rotate outer and inner races 12, 14 in the counter-clockwise direction. As such, pressurized fluid may be selectively supplied to fluid chambers in the fluid actuator respectively associated with the next adjacent counter-clockwise sprag assembly similarly to that as explained above with respect to first sprag 22. Thus, first sprag assembly 22 may rotate outer and inner races 12, 14 a first degree of rotation about axis 18, e.g., 40 degrees, and the next adjacent counter-clockwise sprag assembly may rotate outer and inner races 12, 14 a second degree of rotation about axis 18, e.g., 40 degrees. It is contemplated that subsequent actuation of adjacent counter-clockwise sprag assemblies may also rotate outer and inner races 12, 14 subsequent degrees of rotation to achieve any number of degrees of rotational movement of outer and inner races 12, 14, e.g., 360 degrees. It is also contemplated that similar actuation of adjacent clockwise sprag assemblies may rotate outer and inner races 12, 14 in a clockwise direction similar to the manner in which outer and inner races 12, 14 may be rotated in the counter-clockwise direction. It is further contemplated that subsequent actuation of each of the sprag assemblies 16 may establish an actuation sequence that may be repeated any number of times to substantially continuously rotate outer and inner races 12, 14.

Selectively omitting the actuation one or more of the sprag assemblies 16 during actuation sequences may provide an adjustability of the rotational output fluid motor 10. For example, actuation all of sprag assemblies 16 may provide a maximum rotational output torque of fluid motor 10, selectively omitting one or more of sprag assemblies 16 may provide decreased rotational output torque of fluid motor 10, and actuating only one of sprag assemblies 16 may provide a minimum rotational output torque of fluid motor 10. It is contemplated that rotational output speed of motor 10 may inversely correspond to the rotational output torque. For example, if fluid motor 10 includes nine sprag assemblies 16, selectively omitting one or more sprag assemblies 16 may provide nine step change ratios, e.g., 9:9, 8:9, 7:9, 6:9, 5:9, 4:9, 3:9, 2:9, and 1:9, each corresponding to the rotational degree each sprag assembly rotates outer and inner races 12, 14 and the combined rotational output, e.g., torque and speed, for an actuation sequence. It is also contemplated that the different step change ratios may be achieved by selectively not supplying pressurized fluid to one or more of the fluid actuators, e.g., fluid actuators 34 and 36, associated with a respective sprag assembly, e.g., first sprag assembly 22, during a particular actuation sequence.

Referring to FIG. 4, the various step change ratios of fluid motor 10 may be further varied by adjustment mechanism 90 as a function of the ratio of slot 108 to lever arm 106. For example, if the ratio of slot 108 to lever arm 106 is 1:2, fluid motor 10 may include a continuously variable output ratio from a maximum output to approximately one half a corresponding rotational degree a sprag assembly rotates outer and inner races 12, 14, e.g., ½ of 40 degrees or 20 degrees. For example, if fluid motor 10 includes nine sprag assemblies 16 and thus nine step change ratios, selective actuation of adjustment plates 92, 94 and thus the ratio of lever arm 106 may provide substantially continuously variable ratios between the maximum ratio, e.g., 9:9, and the minimum ratio, e.g., 1:9. Specifically, the position of pivot 102 may be adjusted to reduce the effective length of pivot arm 106, and thus the amount of movement of piston 38 transferred to outer and inner races 12, 14, without selectively omitting actuation of one or more sprag assemblies 16. That is, actuating nine sprag assemblies and adjusting pivot 102 from a maximum lever arm to a ⅝ths lever arm may provide a substantially continuous ratio from 9:9 to 8:9 or the actuation of only eight of the nine sprag assemblies. Actuation of eight sprag assemblies and adjusting pivot 102 from the maximum lever arm to a ⅞ths lever arm may provide a substantially continuous ratio from 9:8 to 7:9 or the actuation of only seven of the nine sprag assemblies. Subsequent actuation of fewer sprag assemblies and similarly adjusting pivot 102 to vary the lever arm to a corresponding fraction may provide substantially continuously variable output to a minimum of ½ of the actuation of one sprag assembly, e.g., actuating only one of the nine sprag assemblies and adjusting pivot 102 to vary the lever arm from a maximum to a ½ lever arm. It is contemplated that fluid motor may include any quantity of sprag assemblies 16 and the timing associated with selectively supplying pressurized fluid thereto may be adjusted to provide a substantially continuous rotary motion of outer and inner races 12, 14. It is also contemplated that the various step changes of motor 10 may be further varied by adjusting the displacement stroke of piston 38 via hydraulic circuit 42.

Referring again to FIG. 4, multiple fluid motors 10, 10a, 10b, 10c may be connected to output 200 to further increase the continuousness of rotary motion delivered thereto. Specifically, the timing of supplying pressurized fluid to one or more sprag assemblies of respective fluid motors may be staggered to further increase the continuousness of the rotary motion. For example, a first sprag assembly of fluid motor 10 may be actuated to rotate outer and inner races 12, 14, then a first sprag assembly of fluid motor 10a may be actuated to rotate outer and inner races thereof, then a first sprag assembly of fluid motor 10b may be actuated to rotate outer and inner races thereof, and then fluid motor 10c may be similarly actuated and the sequence repeated for subsequent sprag assemblies. It is contemplated that the first sprag assembly of a subsequent fluid motor, e.g., fluid motor 10b, may be actuated any time after the actuation of the first sprag assembly of a previous fluid motor, e.g., fluid motor 10. It is also contemplated that fluid motors 10, 10a, 10b, 10c may each include the same or different quantities of sprag assemblies. It is also contemplated that fluid motors 10, 10a, 10b, 10c may be actuated in any sequence and adjusted according to desired drive directions, speeds, and/or loads with respect to output 200. It is further contemplated that rotational energy may be recoverable by operatively connecting one or more of fluid motors 10, 10a, 10b, 10c and/or output 200 to an energy storage device such as, for example, an accumulator, a flywheel, a generator, and/or other energy storage device known in the art.

Because sprag 22 may be hydraulically actuated, it actively locks outer and inner races 12, 14 for substantially mutual rotation about axis 18 potentially reducing the occurrence of lost motion inherent commonly associated with passive sprags. Additionally, because sprag 22 may be actively actuated, it may be configured as an input member converting tangential motion to rotary motion. Furthermore, because sprag 22 may be hydraulically actuated, may include ridges 72, 73, and may include ridges 72, 73 staggered with respect to one another, it may provide increased frictional engagement with outer and inner races 12, 14 potentially allowing for increased torque transfer over passively actuated sprags.

It will be apparent to those skilled in the art that various modifications and variations can be made to the disclosed fluidly actuated sprag. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A sprag configured to operate in a first mode allowing substantially mutual rotation of inner and outer races about an axis and a second mode allowing relative rotation between the inner and outer races, comprising:
   at least one actuator configured to selectively extend and retract;
   an outer surface configured to selectively lock the inner and outer races together as a function of the at least one actuator selectively extending.

2. The sprag of claim 1, wherein the at least one actuator is a fluid actuator.

3. The sprag of claim 1, further including:
   a body; and
   a fluid passageway disposed within the body and configured to communicate pressurized fluid toward the at least one actuator.

4. The sprag of claim 1, further including a plurality of ridges on the outer surface, the plurality of ridges being substantially complimentary to a plurality of grooves on the inner and outer races.

5. The sprag of claim 1, wherein the sprag is an input and at least one of the inner and outer races is an output and the sprag is configured to receive a substantially linear motion and impart a substantially rotary motion to the inner and outer races as a function of the substantially linear motion.

6. The sprag of claim 1, further including:
   a first part engaging the inner race; and
   a second part engaging the outer race;
   wherein the at least one actuator is operatively associated with the first and second parts and configured to move the first and second parts relative to one another.

7. The sprag of claim 1, wherein the at least one actuator is a plurality of actuators and the sprag further includes a plurality of springs.

8. The sprag of claim 1, wherein the sprag is disposed between the inner and outer races and configured to operate in the first mode as a function of pressurized fluid being selectively supplied to the at least one actuator.

9. A method of transferring torque between an inner race and an outer race comprising:
   transmitting a first force to at least one sprag disposed between the inner and outer races;
   actuating the at least one sprag to substantially lock the inner and outer races together;
   and transferring the first force to the inner and outer races via the at least one sprag.

10. The method of claim 9, wherein:
    the at least one sprag includes first and second parts and at least one fluid actuator operatively associated with the first and second parts; and
    actuating the at least one sprag includes extending the at least one fluid actuator.

11. The method of claim 9, further including
    moving the at least one sprag in a substantially linear direction as a function of the first force; and
    moving the inner and outer races in a substantially rotary motion about an axis as a function of moving the sprag in the substantially linear direction.

12. The method of claim 9, wherein:
    the at least one sprag includes at least one fluid passageway disposed therein in fluid communication with at least one fluid actuator; and
    actuating the at least one sprag includes selectively supplying pressurized fluid to the at least one fluid actuator.

13. The method of claim 9, wherein the at least one sprag includes a plurality of fluid actuators, the method further including:
    selectively supplying pressurized fluid to the plurality of fluid actuators to actuate the at least one sprag; and
    releasing the at least one sprag as a function of selectively ceasing to supply pressurized fluid to the plurality of fluid actuators.

14. A sprag comprising:
    an outer surface configured to selectively engage inner and outer races;
    an inner surface supported on a pin;
    first and second parts each forming at least a portion of the outer surface;
    at least one fluid actuator and at least one biasing member;
    wherein the at least one fluid actuator affects movement of the first and second parts with respect to one another to selectively allow the outer surface to engage the inner and outer races as a function of pressurized fluid selectively supplied to the at least one fluid actuator.

15. The sprag of claim 14, further including a plurality of ridges disposed on the outer surface and configured to be substantially complimentary to a plurality of grooves disposed on the inner and outer races.

16. The sprag of claim 15, wherein the plurality of ridges configured to be substantially complimentary to the plurality of grooves disposed on the inner race are staggered with respect to the plurality of ridges configured to be substantially complimentary to the plurality of grooves disposed on the outer race.

17. The sprag of claim 14, wherein the at least one fluid actuator is a piston-cylinder arrangement and the at least one biasing member is a spring.

18. The sprag of claim 14, further including at least one fluid passageway disposed within the sprag and configured to communicate pressurized fluid to the at least one fluid actuator.

19. The sprag of claim 18, wherein the pin member includes a fluid passageway therein configured to communicate pressurized fluid from a source toward the at least one fluid passageway disposed within the sprag.

20. The sprag of claim 14, wherein;
    the first and second parts form a body;

the body includes a first radial dimension on a first side thereof and a second radial dimension on a second side thereof, the first dimension being greater than the second dimension; and the at least one fluid actuator is configured to expand the first and second parts to enlarge the first dimension.

* * * * *